H. S. LANSDELL & J. S. LENG.
Pipes.
No. 162,833.
Patented May 4, 1875.
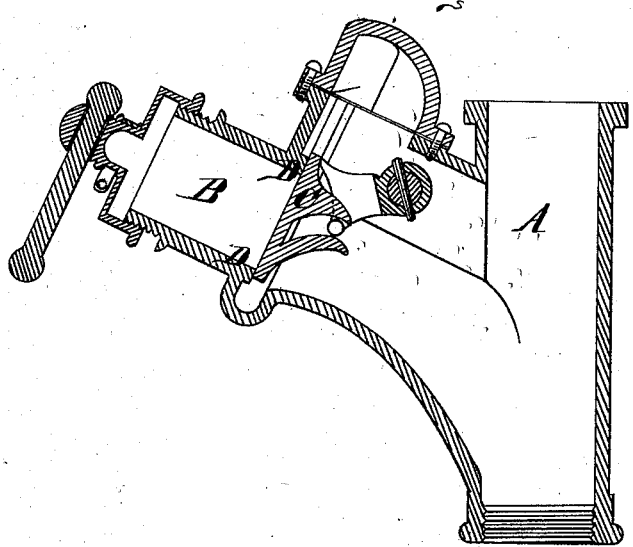
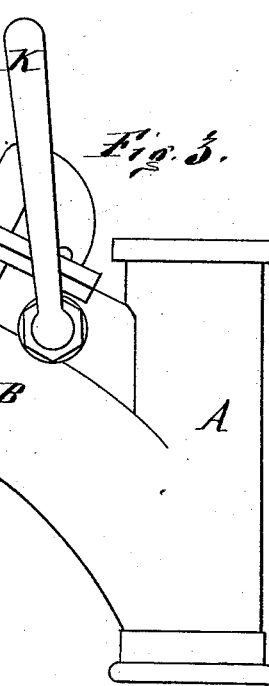
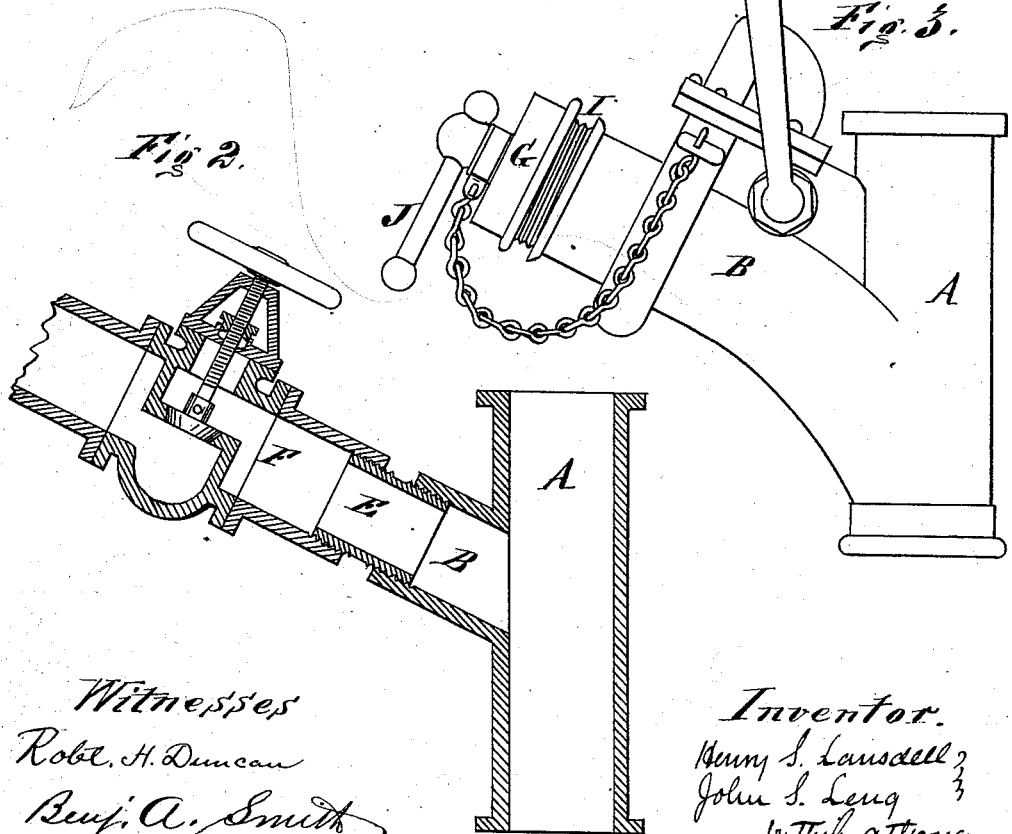
Witnesses
Robt. H. Duncan
Benj. A. Smith
Inventor.
Henry S. Lansdell
John S. Leng
by their attorney
Saml. A. Duncan

UNITED STATES PATENT OFFICE.

HENRY S. LANSDELL AND JOHN S. LENG, OF BROOKLYN, NEW YORK.

IMPROVEMENT IN PIPES.

Specification forming part of Letters Patent No. 162,833, dated May 4, 1875; application filed April 7, 1875.

*To all whom it may concern:*

Be it known that we, HENRY S. LANSDELL and JOHN S. LENG, both of the city of Brooklyn, county of Kings and State of New York, have invented a new and useful Improvement in Pipes, of which the following is a specification:

The invention relates to a new and useful improvement in the method of uniting the section of a branch pipe which carries the valve to the main pipe, when the pipes are used for conducting and regulating the flow of water, steam, or other fluids; and consists of the combination of a main and branch pipe, when both are cast in one piece, and the branch pipe at the time of casting is provided with a valve-seat, and otherwise formed to receive a valve. The state of the art prior to this invention, in respect to the union of main and branch pipes, and the location of valves in such branch pipes, has been as follows: A portion of the main and branch pipes has been cast in one piece; but a valve has never been seated in that portion of the branch pipe which was cast with the main pipe, and consequently no fittings to receive the valve were cast upon such branch pipe. Whenever it was desired to locate a valve in the branch pipe, whether near to or at a distance from the main pipe, a short piece of pipe especially adapted to receive the valve has been fitted up and screwed or coupled to the branch pipe. In accordance with this invention, whenever it is desired to locate a valve near to or at a moderate distance from the main pipe, a portion of the main pipe and that portion of the branch pipe which is to receive the valve form a single casting, the valve-seat being cast in the branch pipe at the desired point, at the same time, and forming a part thereof.

The invention is fully illustrated and compared to the method of uniting main and branch pipes in common use by reference to the accompanying drawing, in which—

Figure 1 is a sectional view of the main and branch pipes as constructed according to this invention, the valve being in position in the branch pipe, the valve-seat being also shown. Fig. 2 is a sectional view of the method generally employed of uniting the portion of the pipe which carries the valve to the branch pipe. Fig. 3 is a front view of main and branch pipes constructed according to this invention, as applied to water-pipes to be employed as security from fire.

In all the figures, A represents the main pipes. B represents the branch pipe. C represents the valve. D represents the valve-seat.

In Fig. 2, E represents the nipple, which couples the valve-carrying pipe F to the branch pipe B. F represents the section of the valve-carrying pipe.

In Fig. 3, G represents the adjustable cap for end of branch pipe B. I represents the hose-nipple. J represents lever for operating cap G. K represents lever-handle which operates the valves.

Additional lengths of pipes may be coupled to the ends of the main and branch pipes by any of the usual methods.

The main advantages of the present invention are, first, economy of construction and application. It is apparent that when the portion of the branch pipe which carries the valve is cast with the main pipe, there is a great saving of time, labor, and expense, which, in the usual construction, are consumed in the fitting of the short section of the pipe which contains the valve to the end of the branch pipe, which is commonly cast with the main pipe. This fitting requires the cutting of threads upon the ends of the pipe to be joined, and upon the coupling-nipple which unites them. So, too, after the fittings have been completed, the sections must be actually joined, which involves additional labor and expense. Second, greater security and reliability. It is well understood that the joints of pipe, however skillfully formed, are more or less liable to leakage, and are less strong and reliable than the solid portions of the pipe. The sections of the pipe, at any particular joint, are liable to become partially or wholly unscrewed by attempts to disconnect other sections at a different joint. This is especially the case when the coupling has become loosened by the expansion of the metal under increased temperature. When the branch pipe is used for a fire-pipe the hose-nipple is generally protected by a cap firmly screwed upon it. This cap must be removed before the hose can be attached to the nipple. In the usual construction, where there is a joint between the valve and the main pipe, the effort to unscrew the cap, which is liable to become rusted to the pipe, starts and unscrews the joint near the main pipe, causing leakage, and, in case of fire, a delay which often proves disastrous.

In the present construction, under this invention, there being no joint between the cap and the main pipe, no such difficulty can arise.

This invention is not designed to be limited to the union of pipes which form any special angle with each other, but includes what are designated as the T-joint, as well as the Y-joints, which latter are shown in the drawing. Neither is the invention designed to be limited to the use of or to cover any particular variety of valve to be used in combination with the branch pipe; but any of the valves in use can be employed to regulate the flow of the fluid through the branch pipe.

In the drawing accompanying this specification the valve shown is of the variety invented by us, and known as the "cam and lever valve." We consider this preferable because of its quick and easy action, its durability, and efficiency in all respects to accomplish the end desired.

What is claimed as new is—

The combination of a main and a branch pipe, when both are cast in a single piece, and the branch pipe so cast is provided with a valve-seat, and otherwise adapted to receive the valve, substantially as and for the purpose set forth.

HENRY S. LANSDELL.
JOHN S. LENG.

Witnesses:
R. H. DUNCAN,
B. A. SMITH.